(12) United States Patent
Leisenberg

(10) Patent No.: US 8,690,565 B2
(45) Date of Patent: Apr. 8, 2014

(54) SHAFT FURNACE AND METHOD FOR HEAT-TREATING MOULDED BODIES CONTAINING CARBON

(76) Inventor: Wolfgang Leisenberg, Bad Nauheim/Steinfurth (DE)

( * ) Notice: Subject to any disclaimer, the term of this patent is extended or adjusted under 35 U.S.C. 154(b) by 501 days.

(21) Appl. No.: 13/056,878

(22) PCT Filed: Jul. 31, 2008

(86) PCT No.: PCT/EP2008/060064
§ 371 (c)(1),
(2), (4) Date: Apr. 28, 2011

(87) PCT Pub. No.: WO2010/012307
PCT Pub. Date: Feb. 4, 2010

(65) Prior Publication Data
US 2011/0195369 A1  Aug. 11, 2011

(51) Int. Cl.
*F27D 1/14* (2006.01)
(52) U.S. Cl.
USPC .............................. 432/95; 432/125; 432/101
(58) Field of Classification Search
USPC .................. 432/95, 96, 99, 101, 102, 125
See application file for complete search history.

(56) References Cited

U.S. PATENT DOCUMENTS 3,790,336 A * 2/1974 Brede et al. .................. 432/163
6,210,156 B1 * 4/2001 Horvath, Jr. .................. 432/125
7,086,856 B1 * 8/2006 Lazarou ........................ 432/192
2007/0065766 A1   3/2007 Mnikoleiski et al.
2010/0254874 A1 * 10/2010 Mahieu et al. ................ 423/247

FOREIGN PATENT DOCUMENTS

| CN | 201074958 Y | 6/2008 |
|----|-------------|--------|
| EP | 1742003 A1  | 1/2007 |
| SU | 815444 A1   | 3/1981 |
| WO | 99/06779 A1 | 2/1999 |

OTHER PUBLICATIONS

International Search Report issued in corresponding application No. PCT/EP2008/060064, completed Jun. 15, 2009 and mailed Jun. 24, 2009.
English Translation of the Chinese Patent and Trademark Office Search Report, in the corresponding Chinese application, Application No. 200880130616.3, completed Feb. 27, 2013.
English Translation of an Office Action in the corresponding Chinese application, Application No. 200880130616.3, completed Mar. 5, 2013.

* cited by examiner

*Primary Examiner* — Gregory A Wilson
(74) *Attorney, Agent, or Firm* — Griffin & Szipl, P.C.

(57) ABSTRACT

The invention relates to a shaft furnace (10) and a method for heat treating carbonaceous molded parts, particularly anodes (17), having an arrangement of the molded parts in at least one molded part column (11 to 15) disposed between tempering shaft devices (19, 20, 21) comprising a plurality of molded part rows (16) disposed above each other in a conveyor shaft, the rows being moved past temperature fields of the tempering shaft devices (19, 20, 22) and passing through a heating zone (25), a firing zone (27) having a burner device (28), and a cooling zone (26), wherein thermally insulating intermediate layers are disposed both between the temperature fields of the tempering shaft devices (19, 20, 22) and between the molded part rows of the molded part columns.

16 Claims, 6 Drawing Sheets

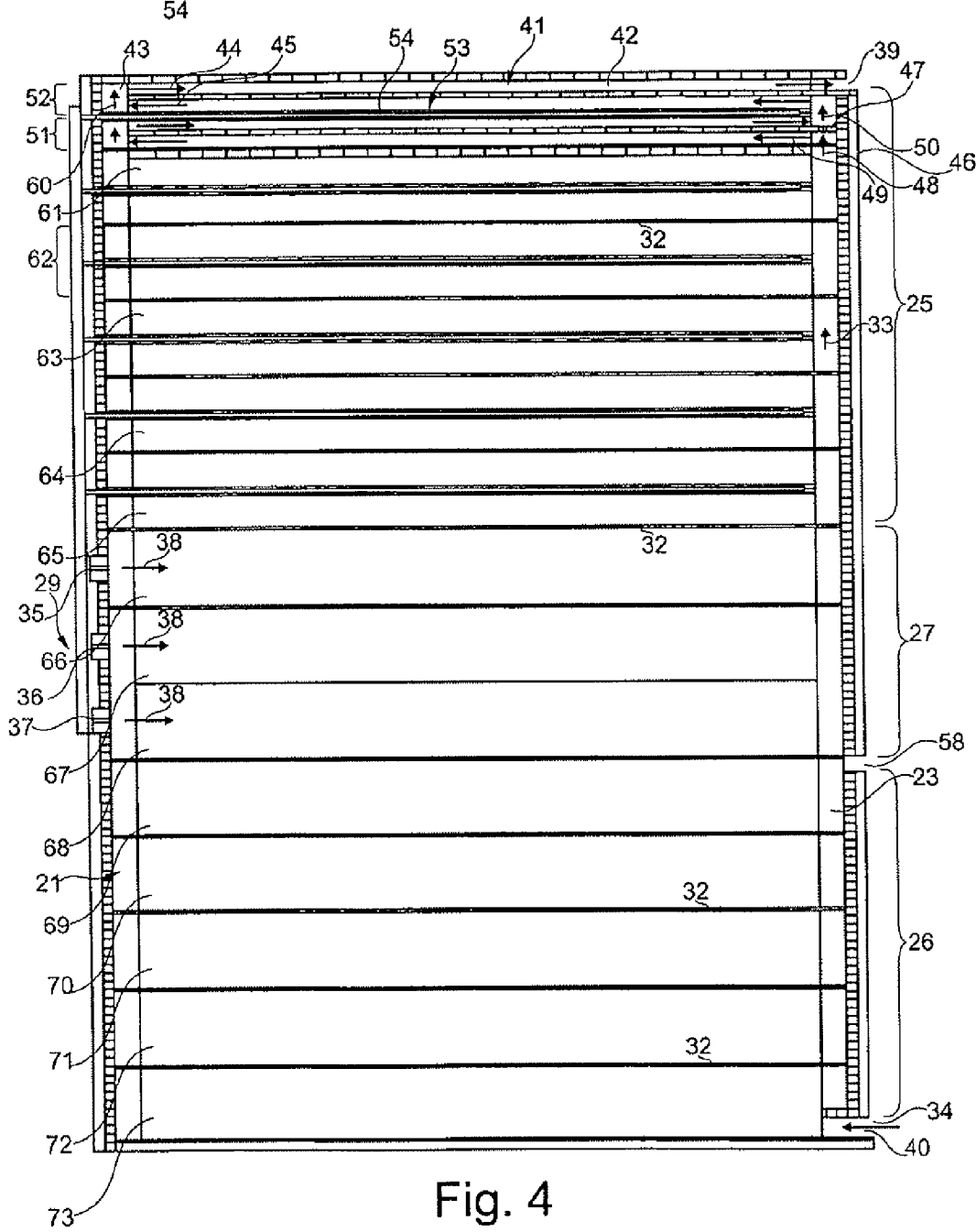

| Temperature zone | Tempering phase | Gas temperature | Anode temperature | Temperature time (gradient) |
|---|---|---|---|---|
| | h | °C | °C | K/h |
| 60 | 12 | 232 | 70 | 8.33 |
| 61 | 24 | 363 | 170 | 8.33 |
| 62 | 36 | 485 | 285 | 10.83 |
| 63 | 48 | 646 | 415 | 10.83 |
| 64 | 60 | 842 | 580 | 16.67 |
| 65 | 72 | 1047 | 780 | 16.67 |
| 66 | 84 | 1120 | 978 | 16.25 |
| 67 | 96 | 1120 | 1075 | 0.00 |
| 68 | 108 | 1120 | 1075 | 0.00 |
| 69 | 120 | 383 | 963 | -18.75 |
| 70 | 132 | 291 | 745 | -17.50 |
| 71 | 144 | 209 | 550 | -15.00 |
| 72 | 156 | 133 | 370 | -15.00 |
| 73 | 168 | 58 | 190 | -15.00 |

Rows 60–66 grouped as 25; row 67–68 grouped as 27; rows 69–73 grouped as 26.

Fig. 7

SHAFT FURNACE AND METHOD FOR HEAT-TREATING MOULDED BODIES CONTAINING CARBON

This is a National Phase Application in the United States of International Patent Application No. PCT/EP2008/060064, filed Jul. 31, 2008, the entire disclosure of which is incorporated herein by reference.

FIELD OF THE INVENTION

The present invention pertains to a shaft furnace for heat-treating moulded bodies containing carbon, particularly anodes, with an arrangement of the moulded bodies in at least one moulded body column that is arranged between tempering shafts and features in a conveyor shaft a plurality of moulded body rows that are arranged on top of one another, wherein these moulded body rows are moved past a plurality of temperature zones on their path from an inlet temperature zone to an outlet temperature zone and pass through a heating zone, a firing zone that is provided with a burner device and a cooling zone. The invention furthermore pertains to a method for heat-treating moulded bodies containing carbon, particularly anodes.

BACKGROUND OF THE INVENTION

WO 99/06779 describes a shaft furnace for continuously heat-treating moulded bodies that contain carbon and are realized in the form of anodes in a column arrangement, in which the anodes are conveyed through a heating zone, a firing zone and a cooling zone of a furnace between tempering shafts by means of a conveying device. In the known method, the moulded bodies are arranged in moulded body rows that are positioned on top of one another and conveyed through heating shafts in a conveyor shaft on their path between an insertion station and a removal station. In this case, all of the moulded body rows arranged on top of one another form a moulded body column.

Due to the realization in the form of only one moulded body column, one respective tempering shaft is provided to both sides of the single moulded body column. The realization in the form of only one moulded body column also limits the production capacity to the height of the moulded body column. Based on the known method and the known device used for carrying out this method, the production capacity therefore can only be increased by correspondingly multiplying the entire furnace such that the installation of a complete system with increased production capacity also has a corresponding space requirement.

In this case, the space requirement for accommodating a plurality of the known furnaces is additionally increased due to the fact that burner devices provided in the firing zone of the known furnace are respectively arranged transverse to the two tempering shafts that extend in the longitudinal direction of the moulded body rows and therefore protrude laterally. Consequently, the width of the entire furnace is essentially defined by the laterally arranged burner devices, as well as the supply and the connecting lines connected to the burner devices.

Analogous to the continuous transport of the moulded body rows between the tempering shafts, the lateral arrangement of the burner devices promotes a non-uniform temperature distribution in the moulded bodies due to the formation of so-called "hot spots" such that moulded bodies with an irregular structure are produced and one has to accept the corresponding disadvantageous effects that, if the moulded bodies are realized in the form of anodes, manifest themselves in the form of an uneven electrode consumption.

SUMMARY OF THE INVENTION

The present invention is based on the objective of proposing a shaft furnace and a method for heat-treating moulded bodies containing carbon in a shaft furnace which respectively make it possible to thermally act upon the moulded bodies in a largely uniform fashion such that the formation of a temperature gradient is prevented.

This objective is attained according to the invention with the characteristics of a shaft furnace in that the shaft furnace (10) for heat-treating moulded bodies containing carbon, particularly anodes (17), with an arrangement of the moulded bodies in at least one moulded body column (11 to 15) that is arranged between tempering shafts (19, 20, 21) and features in a conveyor shaft (57) a plurality of moulded body rows (16) that are arranged on top of one another, wherein these moulded body rows are moved past a plurality of temperature zones (60 to 73) of the tempering shafts (19, 20, 22) on their path from an inlet temperature zone (60) to an outlet temperature zone (73) and pass through a heating zone (25), a firing zone (27) that is provided with a burner device (28) and a cooling zone (26), is characterized in that thermally insulating intermediate layers (32, 18) are arranged between the temperature zones (60 to 73) of the tempering shaft (19, 20, 22), as well as between the moulded body rows of the moulded body column. Additional, particularly beneficial, embodiments of the invention are provided in accordance with the following subsidiary shaft furnace devices.

In accordance with a second shaft furnace embodiment of the invention, the first embodiment is modified so that the temperature zones (60 to 73) of the tempering shafts (19, 20, 22) feature channels (42) that extend in the longitudinal direction of the moulded body rows (16) and are connected to one another on their ends by means of deflection devices (43) in order to form a channel arrangement (41) that ascends in a serpentine-like fashion. In accordance with a third shaft furnace embodiment of the invention, the second embodiment is modified so that at least one throttle device for reducing the volumetric flow in an upstream temperature zone area (51) is provided in the channel arrangement (41) of a temperature zone (60 to 73). In accordance with a fourth shaft furnace embodiment of the invention, the second embodiment and the third embodiments are modified so that the channels (42) are three-dimensionally angled such that the channels from an upstream temperature zone area (51) proportionally extend in a downstream temperature zone area (52) and vice versa. In accordance with a fifth shaft furnace embodiment of the invention, the first embodiment, the second embodiment, the third embodiment, and the fourth embodiment are modified so that a bypass (47) for directly connecting two adjacent channels (42) to one another is provided in the flow inlet area (46) of a temperature zone (60 to 73).

This objective is also attained according to the invention with the characteristics of a shaft furnace according to a sixth embodiment of the invention in that the shaft furnace (10) for heat-treating moulded bodies containing carbon, particularly anodes (17), with an arrangement of the moulded bodies in at least one moulded body column (11 to 15) that is arranged between tempering shafts (19, 20, 21) and features in a conveyor shaft (57) a plurality of moulded body rows (16) that are arranged on top of one another, wherein these moulded body rows are moved past a plurality of temperature zones (60 to 73) of the tempering shafts (19, 20, 22) on their path from an inlet temperature zone (60) to an outlet temperature zone (73)

and pass through a heating zone (25), a firing zone (27) that is provided with a burner device (28) and a cooling zone (26), is characterized in that the shaft furnace features at least two conveyor shafts (57) for the simultaneous heat treatment of a plurality of moulded body columns, wherein a heating shaft (19, 20, 22) for the simultaneous heat treatment of both moulded body columns being conveyed in the conveyor shafts is arranged between the conveyor shafts, and wherein temperature zones (66, 67, 68) of the tempering shafts situated in the firing zone are provided with burners (29) of the burner device (28) that are arranged in such a way that the temperature zones are thermally acted upon tangentially to the moulded body rows. Additional, particularly beneficial, embodiments of the invention are provided in accordance with the following subsidiary shaft furnace devices.

In accordance with a seventh shaft furnace embodiment of the invention, the sixth embodiment is modified so that the burners (29) are arranged in such a way that the temperature zones (66, 68, 69) are thermally acted upon in the longitudinal direction of the temperature zones.

In another embodiment of the invention, a shaft furnace, for heat-treating molded bodies containing carbon, for example, anodes, is characterized in that the shaft furnace comprises a heating zone; a firing zone provided with a burner device; a cooling zone; a plurality of tempering shafts, passing through the heating zone, firing zone and cooling zone, and defining a molded body column space arranged to contain at least one molded body column, wherein the molded body column space is divided into a plurality of temperature zones; a plurality of thermal insulating layers separating each temperature zone of the molded body column space and thereby defining a stack of molded body row spaces; and a conveyor shaft disposed to convey the stack of molded body row spaces through the shaft furnace.

In still another embodiment of the invention, a shaft furnace, for heat-treating molded bodies containing carbon, for example, anodes, is characterized in that the shaft furnace comprises a heating zone; a firing zone provided with a burner device; a cooling zone; a plurality of tempering shafts, passing through the heating zone, firing zone and cooling zone, and defining a molded body column space arranged to contain at least one molded body column, wherein the molded body column space is divided into a plurality of temperature zones; a plurality of thermal insulating layers separating each temperature zone of the molded body column space and thereby defining a stack of molded body row spaces; wherein the burner device comprises a plurality of burners arranged to act on the molded body row spaces tangentially; and at least two conveyor shafts disposed to simultaneously convey at least two stacks of molded body row spaces through the shaft furnace.

According to a first inventive solution, generally, thermally insulating intermediate layers are formed between the temperature zones of the tempering shafts, as well as between the moulded body rows of the moulded body column. This counteracts the formation of a temperature gradient in a temperature zone. In addition, this also counteracts the formation of a temperature gradient in the moulded bodies due to thermal conduction between the moulded body rows.

The formation of the smallest temperature gradient possible, particularly in the longitudinal direction of the moulded body rows, is also promoted if the temperature zones of the temperature shaft feature heating channels that extend in the longitudinal direction of the moulded body rows and are connected to one another on their ends by means of deflection devices in order to create a serpentine-like channel arrangement. This ensures that the gas flow is ducted in the longitudinal direction of the moulded body rows.

In order to achieve the smallest temperature gradient possible within a temperature zone, it is also particularly advantageous to provide at least one throttle device that reduces the volumetric flow in an upstream temperature zone area in the heating channels of a temperature zone such that a partial volumetric flow can be directly introduced into downstream areas of the channel arrangement.

Such a throttle device can be realized in a particularly advantageous fashion by providing a bypass that directly connects two adjacent channels to one another in the flow inlet area of a temperature zone.

In order to influence a temperature gradient, it is also advantageous if the channels are three-dimensionally angled relative to one another in such a way that the channels from an upstream temperature zone area proportionally extend in a downstream temperature zone area and vice versa.

According to an alternative inventive solution, generally, the shaft furnace features at least two conveyor shafts for simultaneously heat-treating a plurality of moulded body columns, wherein a tempering shaft for heating the moulded body columns conveyed in the conveyor shafts is arranged between said conveyor shafts, and wherein the temperature zones of the tempering shaft situated in the firing zone are provided with burners that are arranged in such a way that the temperature zones are thermally acted upon tangentially to the moulded body rows.

Due to the tangential alignment of the burners, a moulded body surface is thermally acted upon that is large in comparison with conventional arrangements, in which the moulded body surface is transversely acted upon. The formation of a hot spot does not occur. Due to the sandwich-like arrangement of the tempering shafts, two moulded body columns that are laterally arranged in conveyor shafts can be thermally acted upon in a simultaneous and uniform fashion without tangential radiation losses such that acting upon the moulded body columns tangentially is economically attractive.

The inventive design of the shaft furnace furthermore makes it possible to arrange a plurality of moulded body columns parallel to one another, wherein two adjacent moulded body columns are respectively tempered by a tempering shaft assigned to both moulded body columns. In this case, the burners of the burner device are arranged in the firing zone such that they tangentially act upon the moulded body rows and therefore make it possible for one burner to respectively temper two adjacent moulded body columns or moulded body rows, namely without the burner device interfering with the parallel "layer arrangement" of the moulded body columns.

All in all, the inventive design of the shaft furnace makes it possible to significantly increase the production capacity with a relatively small increase of the space requirement. In comparison with a conventional shaft furnace according to WO 99/06779, a shaft furnace according to the inventive design makes it possible to double the production capacity with only an approximately 50% increase of the space requirement.

If the burners are arranged in such a way that the temperature zones are thermally acted upon in the longitudinal direction of the temperature zones in accordance with one advantageous embodiment of the shaft furnace, it is possible to form a correspondingly aligned longitudinal flow of the flue gas in the temperature zones such that a maximized reach of the flue gas flow is achieved referred to the length of the respective moulded body row.

This objective is also attained according to the invention with the characteristics of a method for continuously heat-treating moulded bodies according to an eighth embodiment of the invention, wherein the method of continuously heat-treating moulded bodies containing carbon, particularly anodes (17), with an arrangement of the moulded bodies in at least one moulded body column (11 to 15) that is arranged between tempering shafts (19, 20, 21) and features in a conveyor shaft (57) a plurality of moulded body rows (16) that are arranged on top of one another, wherein these moulded body rows are moved past a plurality of temperature zones (60 to 73) of the tempering shafts (19, 20, 22) on their path from an inlet temperature zone (60) to an outlet temperature zone (73) and pass through a heating zone (25), a firing zone (27) that is provided with a burner device (28) and a cooling zone (26), is characterized in that the moulded body rows that are respectively arranged between thermally insulating intermediate layers (18) are moved past the temperature zones in a cyclic fashion such that the moulded body rows are in a laterally overlapping position with the assigned temperature zone that is also arranged between thermally insulating intermediate layers (32) during a tempering phase between two forward motion cycles. Additional, particularly beneficial, embodiments of the invention are provided in accordance with the following subsidiary methods for continuously heat-treating moulded bodies.

In accordance with a ninth method for continuously heat-treating moulded bodies embodiment of the invention, the eighth embodiment is modified so that the volumetric flow for a temperature zone area (51) situated upstream of a gas flow formed in the heating zone is reduced in comparison with a downstream temperature zone area (52). In accordance with a tenth method for continuously heat-treating moulded bodies embodiment of the invention, the ninth embodiment is modified so that the reduction of the volumetric flow for the upstream temperature zone area (51) of the gas flow is realized with a bypass (47) that is connected to the downstream temperature zone area (52) of the gas flow. In accordance with an eleventh method for continuously heat-treating moulded bodies embodiment of the invention, the ninth embodiment and the tenth embodiment are modified so that the gas flow is conveyed through channels (42) that are three-dimensionally angled in such a way that the gas flow through channels of an upstream temperature zone area (51) is proportionally conveyed into a downstream temperature zone area (52) and vice versa. In accordance with a twelfth method for continuously heat-treating moulded bodies embodiment of the invention, the ninth embodiment, the tenth embodiment, and the eleventh embodiment are modified so that the gas flows in adjacent temperature zones (60 to 73) are thermally insulated from one another. In accordance with a thirteenth method for continuously heat-treating moulded bodies embodiment of the invention, the ninth embodiment, the tenth embodiment, the eleventh embodiment, and the twelfth embodiment are modified so that a serpentine-like gas flow extending in the longitudinal direction of the anode rows (16) is formed in the temperature zones (60 to 73) of the tempering shafts (19, 20, 22).

In another embodiment of the invention, a method for continuously heat-treating molded bodies containing carbon, for example, anodes, is characterized in that the method comprises the steps of: (a) providing a shaft furnace, for heat-treating molded bodies containing carbon, for example, anodes, comprising: (1) a heating zone; (2) a firing zone provided with a burner device; (3) a cooling zone; (4) a plurality of tempering shafts, passing through the heating zone, firing zone and cooling zone, and defining a molded body column space arranged to contain at least one molded body column, wherein the molded body column space is divided into a plurality of temperature zones; (5) a plurality of thermal insulating layers separating each temperature zone of the molded body column space and thereby defining a stack of molded body row spaces; and (6) a conveyor shaft disposed to convey the stack of molded body row spaces through the shaft furnace, (b) providing molded bodies in the molded body spaces to provide molded body rows, and (c) conveying the molded body rows past the plurality of temperature zones in a path from an inlet temperature zone to an outlet temperature zone, wherein the step of conveying is carried out cyclically such that the molded body rows are in a laterally overlapping position with an assigned temperature zone that is also arranged between thermally insulating intermediate layers during a tempering phase between two forward motion cycles.

According to the invention, generally, the moulded body rows that are respectively arranged between thermally insulating intermediate layers are moved past the temperature zones in a cyclic fashion such that the moulded body rows are arranged in a laterally overlapping position with the assigned temperature zone that is also arranged between thermally insulating intermediate layers during a tempering phase between two forward motion cycles.

The inventive method therefore makes it possible to act upon the moulded bodies with a defined temperature over a phase of definable duration, namely without forming a significant temperature gradient in the moulded bodies due to thermal conduction between the moulded body rows that are arranged on top of one another.

The reduction of a temperature gradient between an upstream portion of the gas flow and a downstream portion of the gas flow is promoted, in particular, if a reduction of the volumetric flow is realized for an area situated upstream of the gas flow.

This reduction of the volumetric flow for the upstream portion of the gas flow can be advantageously realized with a bypass that is connected to the downstream portion of the gas flow.

The formation of a temperature gradient can also be advantageously influenced if the gas flow is conveyed through channels that are three-dimensionally angled relative to one another in such a way that the gas flow is proportionally conveyed from channels of an upstream temperature zone area into a downstream temperature zone area and vice versa.

In order to create a defined temperature in the temperature zones, it is advantageous to thermally insulate the gas flows in adjacent temperature zones from one another.

This objective is also attained according to the invention with the characteristics of a method for continuously heat-treating moulded bodies according to a fourteenth embodiment of the invention, wherein the method for continuously heat-treating moulded bodies containing carbon, particularly anodes (17), with an arrangement of the moulded bodies in at least one moulded body column (11 to 15) that is arranged between tempering shafts (19, 20, 21) and features in a conveyor shaft (57) a plurality of moulded body rows (16) that are arranged on top of one another, wherein these moulded body rows are moved past a plurality of temperature zones (60 to 73) of the tempering shafts (19, 20, 22) on their path from an inlet temperature zone (60) to an outlet temperature zone (73) and pass through a heating zone (25), a firing zone (27) that is provided with a burner device (28) and a cooling zone (26), is characterized in that at least two moulded body columns are simultaneously heat-treated such that that one tempering shaft separating the two moulded body columns from one another serves for thermally acting upon both moulded body columns, wherein temperature zones (66 to 68) of tempering shafts (19, 20, 22) situated in the region of the firing zone (27) are acted upon with burners (29) of the burner device in such a way that a flue gas flow (38) is adjusted that is essentially aligned parallel to the moulded body rows (16).

In another embodiment of the invention, a method for continuously heat-treating molded bodies containing carbon, for example, anodes, is characterized in that the method comprises the steps of: (a) providing a shaft furnace, for heat-treating molded bodies containing carbon, for example, anodes, comprising: (1) a heating zone; (2) a firing zone provided with a burner device; (3) a cooling zone; (4) a plurality of tempering shafts, passing through the heating zone, firing zone and cooling zone, and defining a molded body column space arranged to contain at least two molded body columns, each molded body column comprising a plurality of molded body row spaces stacked on top of one another, wherein the molded body column space is divided into a plurality of temperature zones, (b) providing molded bodies in the molded body spaces to provide molded body rows, (c) conveying the molded body rows with a conveyor shaft past the plurality of temperature zones, from an inlet temperature zone to an outlet temperature zone and through the heating zone, firing zone and cooling zone, and (d) simultaneously heat treating the at least two molded body columns such that that one tempering shaft separating the two molded body columns from one another thermally acts upon both molded body columns, wherein temperature zones of tempering shafts situated in a region of the firing zone are acted upon with burners of the burner device in such a way that a flue gas flow is adjusted that is essentially aligned parallel to the molded body rows.

In this case, generally, the inventive heat treatment of the moulded bodies containing carbon takes place simultaneously in at least two moulded body columns such that a tempering shaft that separates two moulded body columns from one another serves for thermally acting upon both moulded body columns, wherein temperature zones of the tempering shaft arranged in the region of the firing zone are acted upon with burners of the burner device in such a way that a flue gas flow is adjusted that essentially extends parallel to the moulded body rows.

It is particularly advantageous to form the flue gas flow in the longitudinal direction of the temperature zones.

It is preferred to form a serpentine-like gas flow extending in the longitudinal direction of the anode rows in the temperature zones of the heating shafts in order to counteract the formation of a temperature gradient, in particular, in the longitudinal direction of the moulded body rows.

BRIEF DESCRIPTION OF THE DRAWINGS

One preferred embodiment of a shaft furnace, as well as one advantageous variation of the method for continuously heat-treating moulded bodies containing carbon that are realized in the form of anodes in this case, is described below with reference to the drawings.

In these drawings:

FIG. 4 shows a section through the shaft furnace according to FIG. 1 along the line IV-IV in FIG. 1;

FIG. 5 shows a section through a suction channel according to FIG. 4;

FIG. 7 shows a temperature profile of a heating shaft of the shaft furnace according to FIG. 1 in the form of a table.

DETAILED DESCRIPTION OF THE INVENTION

Figure 1:
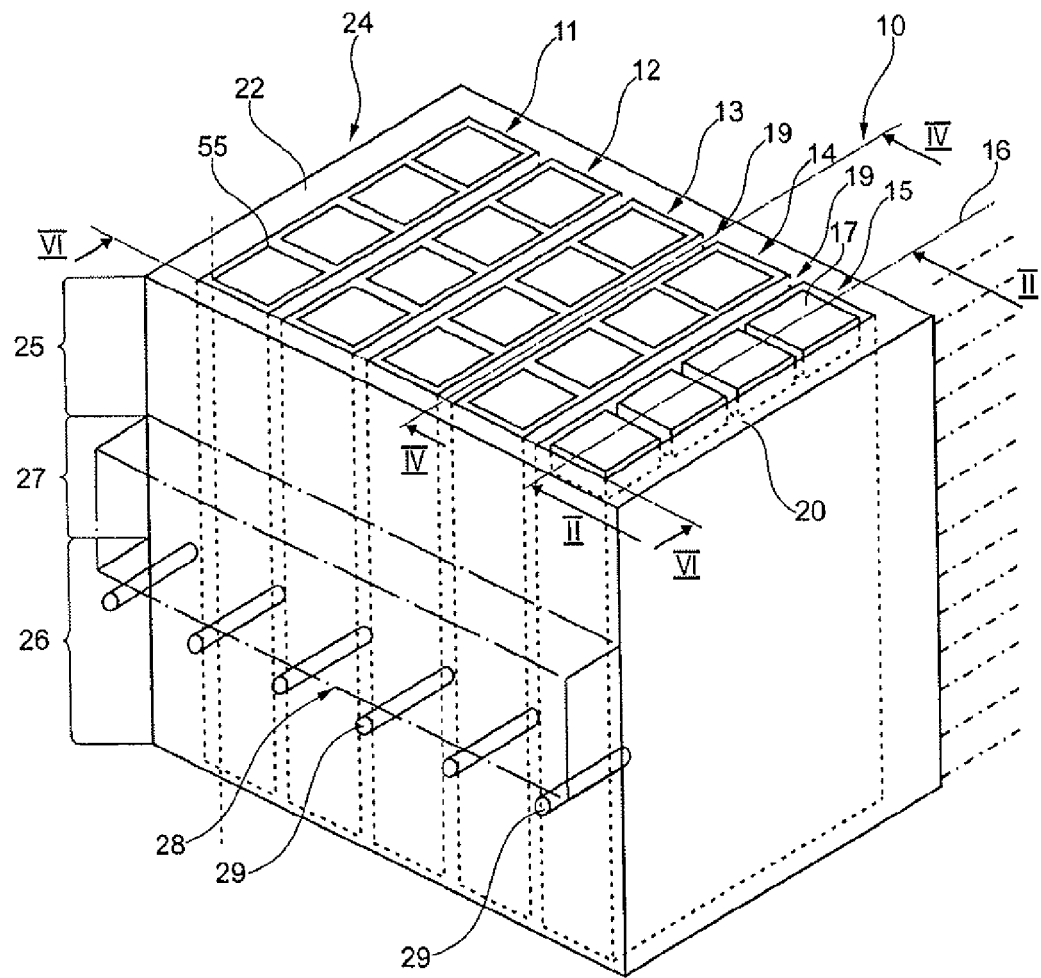
FIG. 1 shows a perspective representation of a shaft furnace for manufacturing anodes that are arranged in a plurality of anode columns.

FIG. 1 shows a shaft furnace 10 with a plurality of moulded body columns in the form of anode columns 11, 12, 13, 14, 15 that respectively feature moulded body rows in the form of anode rows 16 that are arranged on top of one another and respectively comprise four moulded bodies in the form of anodes 17 that are arranged in a row.

Figure 2:
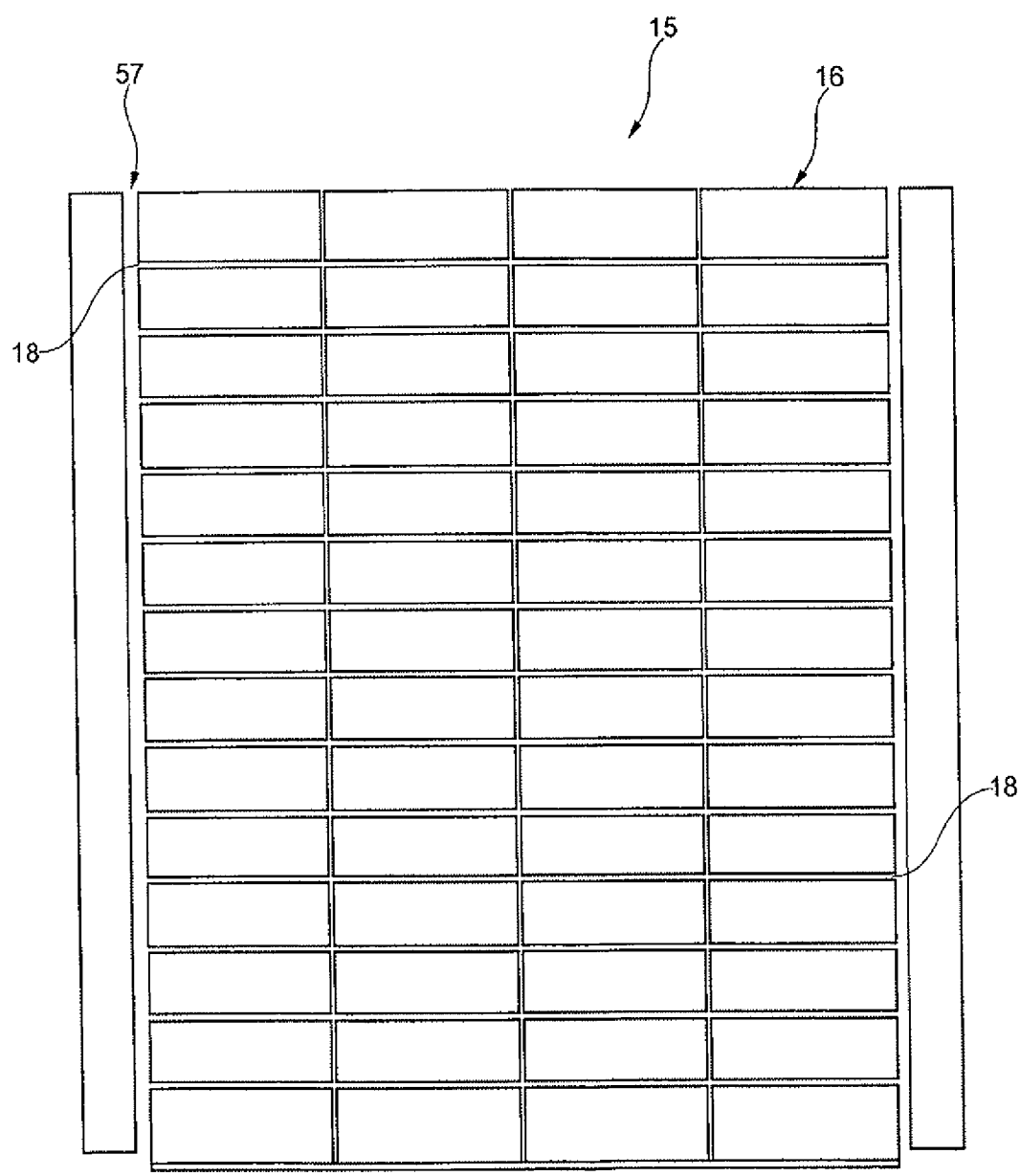
FIG. 2 shows a section through the shaft furnace according to FIG. 1 along the line II-II in FIG. 1.

In the embodiment illustrated in FIG. 1, 14 anode rows in all are arranged such that they lie on top of one another, wherein only the top anode rows 16 is respectively illustrated in order to provide a better overview. FIG. 2 shows the anode column 15 in the form of a sectional representation through the fourteen anode rows 16 that are arranged on top of one another and respectively separated from one another in the vertical direction by a thermally insulating intermediate layer 18. The intermediate layer 18 is preferably realized in the form of a fire-resistant insulating layer of lightweight dead clay. The intermediate layer may be realized in the form of a layer or composed of individual moulded elements such as, e.g., lightweight refractory brick. In the arrangement of the anode rows 16 in a conveyor shaft 57 (FIG. 6), this layer can be respectively placed on the top anode row 16 in the form of a reusable layer.

Figure 3:
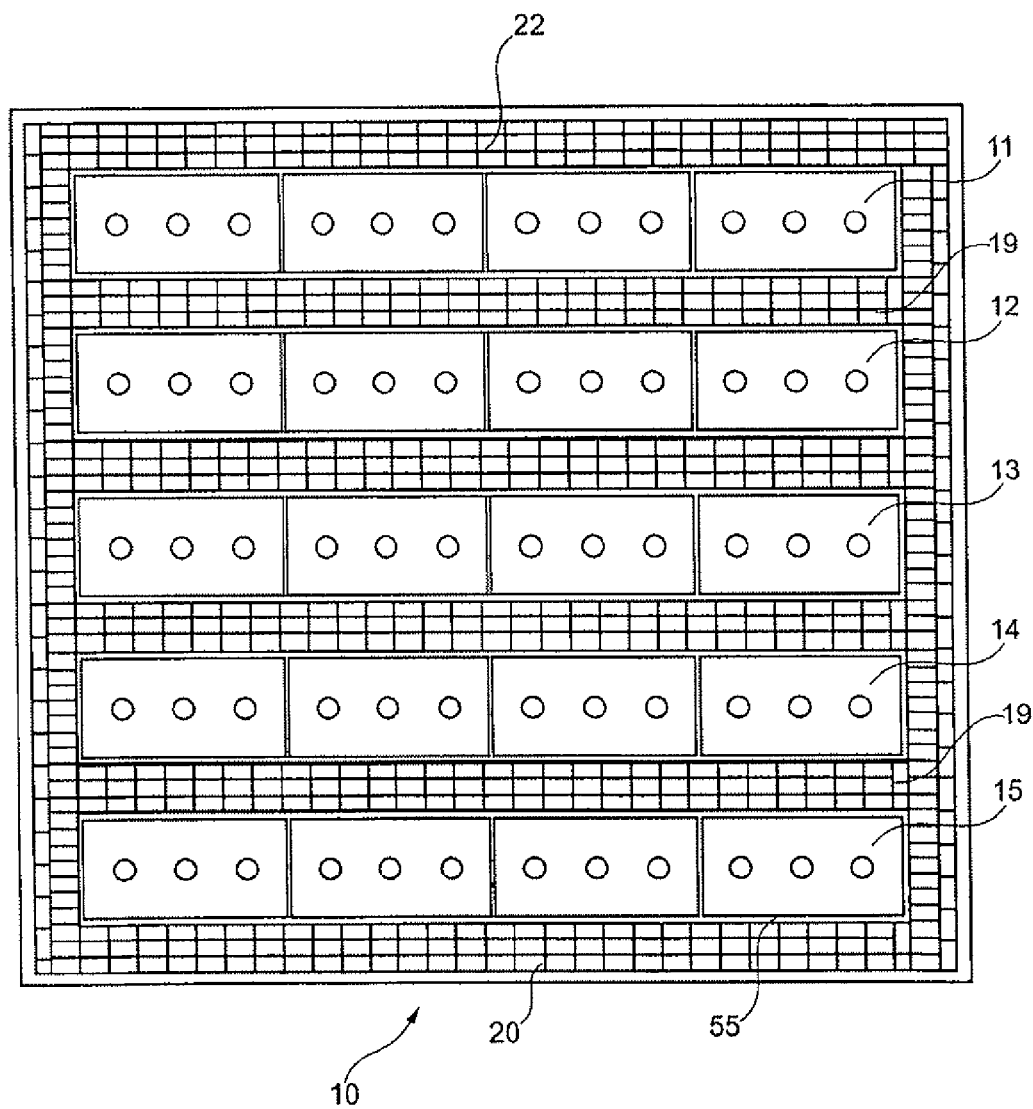
FIG. 3 shows a top view of the shaft furnace according to FIG. 1.

A tempering shaft 19 is respectively arranged between the anode columns 11 to 15 of the shaft furnace 10 illustrated in FIG. 1 and forms a tempering shaft system 24 that is illustrated in FIG. 3 together with other external tempering shafts 20, 22. The tempering shafts 19 that are respectively arranged between two anode columns 11 and 12, and 13, 13 and 14, 14 and 15, as well as the two external tempering shafts 20 and 22 that extend parallel to the tempering shafts 19, are provided with a burner device 28 in a firing zone 27 that is arranged between a heating zone 25 and a cooling zone 26 and respectively feature burners 29 that are assigned to the tempering shafts 19, 20 and 22.

Due to the parallel arrangement of a plurality of anode columns 11 to 15 in accordance with the embodiment of the shaft furnace 10 illustrated in FIG. 1, a theoretically arbitrary number of anode columns can be manufactured with the shaft furnace 10 in a common production cycle within the same production time as a single anode column, wherein the increased anode production is only associated with a comparatively small increase of the space requirement.

According to the sectional representation of a tempering shaft 19 illustrated in FIG. 4, the tempering shaft 19 is divided into 14 temperature zones 60 to 73 that are respectively assigned to the anode rows 16 and thermally insulated from one another by respective insulating layers 32. The insulating layer 32 serves for largely preventing a temperature equalization between the temperature zones 60 to 73 and for adjusting defined temperatures of a gas flow flowing through the tempering shaft 19 within the respective temperature zones 60 to 73. In the lower cooling zone 26 of the tempering shaft 19, the gas flow 33 essentially consists of a fresh air flow or cooling air flow 34 introduced into the bottom temperature zone 73.

In the firing zone 27, a flue gas flow 38 is introduced by means of burner heads 35, 36, 37 of the burner 29. According to FIG. 4 and, incidentally, also FIGS. 1 and 6, the temperature zones 66 to 68 in the firing zone 27 are respectively acted upon by the burner device 28 or the burner heads 35, 36, 37 in such a way that a flue gas flow is adjusted that essentially extends parallel to the anode rows 16, namely a flue gas flow in the longitudinal direction of the temperature zones 66 to 68 in the present instance. Referred to the lateral surfaces 75 of the anodes 17 that are thermally acted upon by the temperature zones 66 to 68, this results in a tangential flow direction that makes it possible to achieve a uniform temperature distribution over the lateral surfaces 75 of the anodes 17 without the formation of hot spots.

The flue gas flow 38 is discharged from the tempering shaft 19 through an exhaust air opening 39 arranged in the top temperature zone 60 of the heating zone 25. An exhaust air opening 58 is provided in the top temperature zone 69 of the cooling zone 26 in order to discharge the cooling air flow 34.

A channel arrangement 41 realized in the temperature zone 60 is illustrated in FIG. 4 based on the example of the top temperature zone 60 of the heating zone 25, wherein this channel arrangement features horizontally extending channels 42 that are connected to one another on their hands by means of deflection devices in the form of connecting channels 43. The connecting channels 43 are respectively situated in the tempering shafts 21 and 23 arranged on the top and on the bottom of the anode rows 16. The horizontally aligned channels 42 in connection with the connecting channels 43 cause the formation of a serpentine-like flow path such that the flows 44, 45 of adjacent channels 42 are oriented in opposite directions and the thermal losses of the channel flows that take place over the flow section in the channels 42 are at least proportionally compensated by the respective oppositely directed flow, wherein a resulting temperature gradient in the horizontal direction of the temperature zone 60 consequently can be maintained as small as possible.

Based on the example of the top temperature zone 60 of the heating zone 25, a flow inlet area 46 of the temperature zone 60 furthermore comprises a bypass 47 that divides an inlet flow 48 into a first partial flow 49 and a second partial flow 50 after it flows through the permeable insulating layer 32, wherein the partial flow 49 is conveyed into an upstream temperature zone area 51 and the partial flow 50 is directly conveyed into a downstream temperature zone area 52. The direct introduction of the heated partial flow 50 into the downstream temperature zone area 52 counteracts the formation of a temperature gradient in the vertical direction.

If so required, a temperature gradient can be purposefully adjusted with a suitable design or adjustment of the bypass 47.

In contrast to the horizontal arrangement of the channels 42 illustrated in FIG. 4, it is also possible to realize the channels 42 in the form of three-dimensionally angled channel structures such that the channels of the upstream temperature zone area 51 proportionally extend in the downstream temperature zone area 52 and vice versa. If so required, a residual heat flow in the vertical direction formed despite the insulating intermediate layers 18 arranged between the anode rows 16 in the anode columns 11 to 15 can be compensated by arranging the colder outlet side of the flue gases on the bottom channel of the temperature zone and the hotter inlet side of the flue gases on the top channel.

Consequently, a largely constant temperature in the temperature zones 60 to 73 is promoted in cooperation with the insulating layers 32 that thermally separate the individual temperature zones 60 to 73 from one another.

According to the illustration of the top temperature zone of the heating zone 25, the temperature zone 60 is provided with a suction channel 53 that in the present embodiment separates the upstream temperature zone area 51 from the downstream temperature zone area 52 and, according to FIG. 5, features a collection channel 54 that extends parallel to the channels 42 and a plurality of degassing channels 56 connecting the collection channel 54 to a degassing gap 55 that surrounds the anodes 17 and is filled with a coke packing.

This makes it possible to deliver volatile degassing components discharged from the still green anodes in the heating zone 25 to the burner device 28 in the form of a fuel additive for the burners 29 via the suction channel 53.

Figure 6:
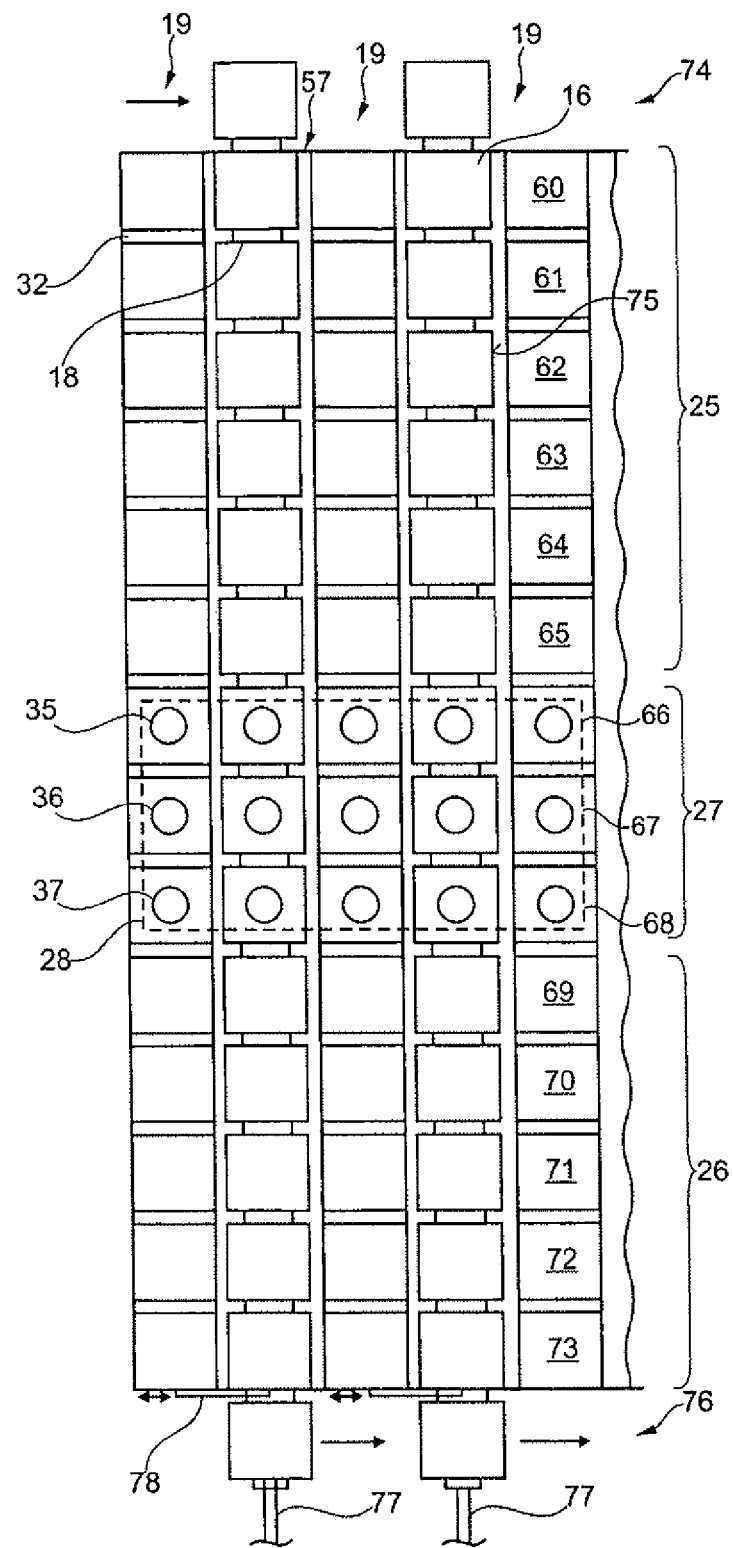
FIG. 6 shows a partially sectioned representation of the shaft furnace according to FIG. 1 along the line VI-VI in FIG. 1.

In order to elucidate the operation of the shaft furnace 10 illustrated in FIG. 1, FIG. 6 shows a partially sectioned representation of the shaft furnace 10 with anode columns 11, 12 that are respectively arranged between tempering shafts 19 and accommodated in conveyor shafts 57 in order to be subjected to a cyclic forward motion. The moulded anodes 17 are not yet fired and therefore still referred to as "green anodes," wherein these anodes are fed to the conveyor shafts 57 that respectively accommodate one anode column 11, 12 in the form of the top anode row 16 in a receiving position 74 by means of a not-shown feed device. FIG. 6 shows the anodes 17 that are arranged in anode rows 16 in the conveyor shafts 57 during a standstill phase that corresponds to a tempering phase of the anode rows between two forward motion cycles. FIG. 6 also clearly shows that the anode rows 16 are respectively arranged within the shaft furnace 10 between thermally insulating intermediate layers 18 and situated in a laterally overlapping position with the assigned temperature zones 60 to 73 of the tempering shafts 19 that are also arranged between thermally insulating intermediate layers 32. This ensures that the respective lateral surfaces 75 of the anodes 17 essentially are acted upon with the temperature of the temperature zones 60 to 73 in their entirety. In this case, the insulating intermediate layers 18 arranged between the anode rows 16 counteract the formation of a temperature gradient within the anodes 17 that results from differently tempered anode rows 16.

After the tempering of the anode rows 16 arranged between the top temperature zones 60 of the tempering shafts 19, said anode rows are advanced by one forward motion cycle, namely downward between the temperature zones 61 of the tempering shafts 19, by means of a conveyor 77 arranged underneath each anode column and held in this position by a holding device 78 during the tempering phase. With each ensuing forward motion cycle, the anode rows 16 successively move past the other temperature zones until they ultimately reach a removal position 76 underneath the shaft furnace 10, in which the anode rows 16 are laterally removed from the respective anode column 11, 12.

After each motion cycle, a new anode row 16 is fed to the conveyor shaft 57 in the receiving position 74. Subsequently, each anode row 16 passes through the temperature profile that is illustrated in an exemplary fashion in FIG. 7 and begins by thermally acting upon the anodes 17 of the anode row 16 with a gas temperature of 232° C. over a duration of twelve hours in the top temperature zone 60. During this process, the green anode reaches a temperature of 70° C. in the temperature zone 60. Each anode row 16 is thusly conveyed downward through the shaft furnace 10 between the tempering shafts 19, 20, 22 that feature the individual temperature zones 60 to 73 over the entire height of the anode column, namely such that the respective residence times specified for the individual temperature zones 60 to 73 in the temperature profile are observed. In the exemplary temperature profile according to FIG. 7, a production time of 168 hours results for a production cycle, in which the green anode 17 is conveyed past the temperature zones 60 to 73 in order to be transformed into a finished, fired anode 17 that can be removed from the shaft furnace 10 in the removal position 76 (FIG. 6) downstream of the temperature zone 73.

The invention claimed is:

1. A shaft furnace, for heat-treating molded bodies containing carbon, for example, anodes, comprising:
 a heating zone;
 a firing zone provided with a burner device;
 a cooling zone;
 a plurality of tempering shafts, passing through the heating zone, firing zone and cooling zone, and defining a molded body column space arranged to contain at least one molded body column, wherein the molded body column space is divided into a plurality of temperature zones;
 a plurality of thermal insulating layers separating each temperature zone of the molded body column space and thereby defining a stack of molded body row spaces; and
 a conveyor shaft disposed to convey the stack of molded body row spaces through the shaft furnace.

2. The shaft furnace according to claim 1, wherein the plurality of temperature zones of the tempering shafts comprise channels that extend in a longitudinal direction of the molded body row spaces and are connected to one another on their ends by deflection devices in order to form a channel arrangement that ascends in a serpentine-like fashion.

3. The shaft furnace according to claim 2, further comprising at least one throttle device arranged to reducing the volumetric flow in an upstream temperature zone area and provided in the channel arrangement of the plurality of temperature zones.

4. The shaft furnace according to claim 3, wherein the channels are three-dimensionally angled such that the channels from an upstream temperature zone area proportionally extend in a downstream temperature zone area and vice versa.

5. The shaft furnace according to claim 2, wherein the channels are three-dimensionally angled such that the channels from an upstream temperature zone area proportionally extend in a downstream temperature zone area and vice versa.

6. The shaft furnace according to one of the preceding claims, further comprising a bypass, provided in a flow inlet area of at least one of the plurality of temperature zones, and arranged to directly connect two adjacent channels to one another.

7. A shaft furnace, for heat-treating molded bodies containing carbon, for example, anodes, comprising:
 a heating zone;
 a firing zone provided with a burner device;
 a cooling zone;
 a plurality of tempering shafts, passing through the heating zone, firing zone and cooling zone, and defining a molded body column space arranged to contain at least one molded body column, wherein the molded body column space is divided into a plurality of temperature zones;
 a plurality of thermal insulating layers separating each temperature zone of the molded body column space and thereby defining a stack of molded body row spaces;
 wherein the burner device comprises a plurality of burners arranged to act on the molded body row spaces tangentially; and
 at least two conveyor shafts disposed to simultaneously convey at least two stacks of molded body row spaces through the shaft furnace.

8. The shaft furnace according to claim 7, wherein the burners are arranged such that the plurality of temperature zones are thermally acted upon in a longitudinal direction.

9. A method for continuously heat-treating molded bodies containing carbon, for example, anodes, comprising the steps of:
 (a) providing a shaft furnace, for heat-treating molded bodies containing carbon, for example, anodes, comprising:
  (1) a heating zone;
  (2) a firing zone provided with a burner device;
  (3) a cooling zone;
  (4) a plurality of tempering shafts, passing through the heating zone, firing zone and cooling zone, and defining a molded body column space arranged to contain at least one molded body column, wherein the molded body column space is divided into a plurality of temperature zones;
  (5) a plurality of thermal insulating layers separating each temperature zone of the molded body column space and thereby defining a stack of molded body row spaces; and
  (6) a conveyor shaft disposed to convey the stack of molded body row spaces through the shaft furnace,
 (b) providing molded bodies in the molded body spaces to provide molded body rows, and
 (c) conveying the molded body rows past the plurality of temperature zones in a path from an inlet temperature zone to an outlet temperature zone,
  wherein the step of conveying is carried out cyclically such that the molded body rows are in a laterally overlapping position with an assigned temperature zone that is also arranged between thermally insulating intermediate layers during a tempering phase between two forward motion cycles.

10. The method according to claim 9, wherein a volumetric flow for a temperature zone area situated upstream of a gas flow formed in the heating zone is reduced in comparison with a downstream temperature zone area.

11. The method according to claim 10, wherein the reduction of the volumetric flow for the upstream temperature zone area of the gas flow is realized with a bypass that is connected to the downstream temperature zone area of the gas flow.

12. The method according to claim 11, wherein the gas flow is conveyed through hannels that are three-dimensionally angled in such a way that the gas flow through channels of an upstream temperature zone area is proportionally conveyed into a downstream temperature zone area and vice versa.

13. The method according to claim 10, wherein the gas flow is conveyed through channels that are three-dimensionally angled in such a way that the gas flow through channels of an upstream temperature zone area is proportionally conveyed into a downstream temperature zone area and vice versa.

14. The method according to claims 9, wherein the gas flows in adjacent temperature zones are thermally insulated from one another.

15. The method according to one of claims 9, wherein a serpentine-like gas flow extending in a longitudinal direction of the anode rows spaces is formed in the plurality of temperature zones of the tempering shafts.

16. A method for continuously heat-treating molded bodies containing carbon, for example, anodes, comprising the steps of:
 (a) providing a shaft furnace, for heat-treating molded bodies containing carbon, for example, anodes, comprising:
  (1) a heating zone;
  (2) a firing zone provided with a burner device;
  (3) a cooling zone;
  (4) a plurality of tempering shafts, passing through the heating zone, firing zone and cooling zone, and defining a molded body column space arranged to contain at least two molded body columns, each molded body column comprising a plurality of molded body row spaces stacked on top of one another, wherein the molded body column space is divided into a plurality of temperature zones,
(b) providing molded bodies in the molded body spaces to provide molded body rows,
(c) conveying the molded body rows with a conveyor shaft past the plurality of temperature zones, from an inlet temperature zone to an outlet temperature zone and through the heating zone, firing zone and cooling zone, and
(d) simultaneously heat treating the at least two molded body columns such that that one tempering shaft separating the two molded body columns from one another thermally acts upon both molded body columns,
wherein temperature zones of tempering shafts situated in a region of the firing zone are acted upon with burners of the burner device in such a way that a flue gas flow is adjusted that is essentially aligned parallel to the molded body rows.

\* \* \* \* \*